June 21, 1966  L. F. JOHNSON ETAL  3,257,625
OPTICAL MASERS COMPRISING THE ACTIVE MEDIA Sr MoO$_4$
Nd, CaMoO$_4$  Nd, AND PbMoO$_4$  Nd
Filed Nov. 20, 1961
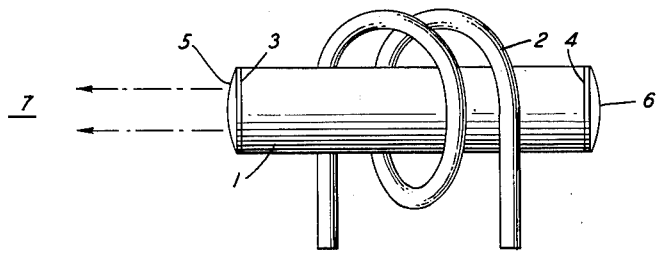
INVENTORS: *L. F. JOHNSON*
*R. R. SODEN*
BY
*Arthur J. Torsiglieri*
ATTORNEY 3,257,625
OPTICAL MASERS COMPRISING THE ACTIVE MEDIA SrMoO₄:Nd, CaMoO₄:Nd, and PbMoO₄:Nd
Leo F. Johnson, North Plainfield, and Ralph R. Soden, Scotch Plains, N.J., assignors to Bell Telephone Laboratories, Incorporated, New York, N.Y., a corporation of New York
Filed Nov. 20, 1961, Ser. No. 153,607
10 Claims. (Cl. 331—94.5)

This invention relates to optical masers for use in the infrared portion of the optical spectrum. The materials of the invention include a molybdate host lattice and additionally contain neodymium ions in the 3+ valence state.

Recently, considerable attention has been focused on a new class of solid state maser devices which are capable of generating or amplifying coherent electromagnetic wave energy in the optical frequency range. Devices of this type, which are described, for example in United States Patent 2,929,922 to Schawlow and Townes, are considered to be operable over the spectral range from far infrared to ultraviolet, an equivalent bandwidth of about $10^{15}$ cycles. Such a bandwidth is capable of providing a great number of new communications channels, thereby multiplying the number of available channels which has heretofore been limited by the characteristics of the heavily used lower frequency portions of the spectrum.

Typically, a maser of the type known in the art employs an active material characterized by a plurality of distinct energy levels, the separation of these levels corresponding to frequencies within the desired operating frequency ranges. More particularly, the separation between two of the energy levels $E_1$ and $E_2$ corresponds to quantized wave energy having a frequency $v_{12}$ given by Bohr's equation $$v_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a metastable higher level. The excited electrons tend to remain in the upper level for a short time before decaying or relaxing to the lower level. The downward transition is normally accompanied by the radiation of wave energy of the frequency corresponding to separation between the energy levels concerned. During maser operation sufficient pump power is supplied to the active medium to produce, at least intermittently, a non-equilibrium population distribution between the pair of energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the metastable state, and that the stimulated emission is coherent and in phase with the signal.

Among the more promising forms of maser are those which utilize an active medium characterized by first, second and third successively higher electron energy levels. Typically, in optical maser materials the upper level is relatively broad, and in some cases is best described as a band. Continuous wave operation of such three-level devices may be achieved, for example, by pumping electrons from the first to the third level from which they relax spontaneously by nonradiative processes, to the second level, thereby producing the desired population inversion between the second and first levels. Advantageously, in masers of this type, the relaxation time between the third and second levels is shorter than that between the second and first levels so that the population of the second level may be continuously maintained during operation of the device. Additionally, as the magnitude of the negative temperature attained depends on the relative populations of the first and second levels, the energy level system of preferred materials also include mechanisms which continuously depopulate the terminal state of the optical transition. Thus, the population inversion is maintained at a relatively high value and maser action is facilitated.

Among the more promising active maser materials are those which comprise a host crystal containing paramagnetic ions from which the stimulated emission occurs. The host crystal must be of a material capable of accepting the paramagnetic ions in such a way that they are able, upon excitation, to fluoresce with good over-all quantum efficiency, with as much as possible of the emitted energy concentrated in a single narrow spectral line.

More particularly, the host must accept the ions in such a way as to minimize coupling between them and the crystal lattice at the maser frequency, while simultaneously permitting relaxation from the pump band to the metastable state. Additionally, the host crystal should be of good optical quality. That is to say, it must be relatively free of scattering centers and hence transparent to the light waves at the operating frequency of the maser. Furthermore, the host should have a low coefficient of absorption at the pump frequency to minimize heating of the maser medium and to promote more efficient utilization of the pump power. Chemical and physical stability are further desiderata. It is also required that the host be of a mechanically workable material, capable of being accurately shaped and highly polished.

A combination of paramagnetic ions with a host lattice meeting the above-mentioned conditions is ruby, which continues to be widely used as an optical maser medium and is, in fact, one of the very few materials which have been operated successfully. Ruby has usable emission lines at .6943 micron and .6921 micron. In addition, ruby having a high concentration of chromium ions is characterized by sharp satellite lines at .7009 micron and .7041 micron. Another successful material, operable at liquid hydrogen temperatures, comprises a calcium fluoride host lattice containing samarium ions. Emission from the samarium ions is at .7082 micron. A more recently discovered optical maser medium, disclosed in copending application Serial No. 139,266, filed September 19, 1961, of Johnson and Nassau, is calcium tungstate containing trivalent neodymium ions. Additional newly discovered materials are disclosed in copending applications Serial Nos. 153,604; 153,603; 153,605 and 153,606, all filed concurrently herewith and assigned to the assignee hereof. These include praseodymium in calcium tungstate operating at about 1.047 microns, thulium in calcium tungstate operating at about 1.91 microns, holmium in calcium tungstate operating at about 2.05 microns, and neodymium in calcium fluoride operating at about 1.05 microns.

Ruby optical masers of the usual design are subject to the disadvantage of requiring a high pump power to establish the required population inversion. The amount of power supplied to the ruby and the conditions of its absorption by the crystal have thus far limited ruby maser operation to producing a pulsed beam of coherent light. It is apparent, however, that in many applications it is highly desirable to produce continuous coherent light beams by maser action.

Furthermore, it is to be noted that the choice of active medium for an optical maser device governs the frequency of the usable emission lines. Thus, it is desirable to provide a variety of optical maser materials in order to make possible the generation and amplification of coherent light beams over the wider range of the optical frequency spectrum. However, despite the discovery of several operable materials, on the basis of present information it is believed that no known theory is able to predict which combinations of ions and host lattices will be successful.

An object of the invention is the generation and amplification of coherent radiation in the infrared portion of the optical frequency spectrum.

It is also an object of the invention to provide an optical maser capable of operation in the infrared range and requiring a relatively low pumping power.

In accordance with this invention, three new fluorescent materials suitable for use in optical masers have been discovered. These materials consist of a host lattice having a chemical composition $XMoO_4$, where X represents a metal chosen from the group consisting of lead, strontium and calcium, in which some of the X ions have been replaced by neodymium ions in the 3+ valence state. Trivalent neodymium is the active maser material. Stimulated emission from the lead molybdate medium is produced at room temperature at 1.0586 microns in the infrared region. At room temperature, stimulated emission from the strontium molybdate medium occurs at 1.0643 microns and 1.0576 microns. At liquid nitrogen temperature emission is in a single line at 1.0640 microns. The calcium molybdate emits at 1.0673 microns at room temperature and at 1.0670 microns at 77° Kelvin.

A feature of the invention is an optical maser having an active medium consisting of trivalent neodymium ions in a molybdate host crystal.

An optical maser in accordance with the invention is shown in the figure. There is depicted a rod-shaped crystal 1 of either lead, strontium or calcium molybdate having an oppropriate small concentration of trivalent neodymium ions as disclosed herein. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4, thereby forming an optical cavity resonator of the type described in a copending patent application Serial No. 61,205, filed October 7, 1960, by Boyd, Fox and Li and issued on September 25, 1962 as United States Patent No. 3,055,257. Advantageously, layer 6 is totally reflecting while layer 5 includes at least a portion which is only partially reflecting to permit the escape of coherent radiation 7 having a wavelength of about 1.06 microns. If desired, rod 1 during operation may be maintained in a bath of a liquified gas, such as nitrogen, to maintain a low temperature with the desirable results hereinafter described.

The lamp 2 is advantageously of a type which produces intense radiation over a broad band extending from about .4 micron to longer wavelengths. Mercury or xenon lamps are considered useful to pump the material of the invention, which is characterized by a plurality of very sharp absorption lines in the specified spectral range. Other types of lamps may, of course, be employed provided they emit sufficient energy at wavelengths corresponding to one or more useful absorption lines of the material. Electrons in the active medium are excited to upper energy levels by the pump power and relax through nonradiative processes to an intermediate level corresponding to one of the $^4F_{3/2}$ levels of the free neodymium ions. This level corresponds to the metastable level of the above-mentioned exemplary three-level system. A negative temperature is thus created between the $^4F_{3/2}$ level and one of the $^4I_{11/2}$ levels. The $^4I_{11/2}$ level lies about 2,000 cm.$^{-1}$ above the ground state and has a negligible population at room temperature. The population of the terminal state may be further reduced by cooling the crystal. Stimulated emission at about 1.06 microns in the infrared is produced by this device.

An optical maser of the type illustrated in the figure has been operated using as an active medium lead molybdate containing .5 atomic percent of neodymium in place of lead. The device produced intense coherent emission at 1.0586 microns in the infrared. Optical masers have also been operated with active media comprising strontium molybdate with 0.2 atomic percent neodymium, and calcium molybdate with 0.5 atomic percent neodymium. Stimulated emission was produced at about 1.064 microns and 1.067 microns, respectively.

Maser action may be achieved over a range of neodymium concentration. Although in principle there is no lower limit on the concentration of $Nd^{+3}$ which may be employed in the crystal 1, yet a practical limit of about 0.01 percent is imposed by the necessity of having sufficient unpaired electrons available to produce a reasonable output. Additionally, the preferred concentration of $Nd^{+3}$ ions in the molybdate host crystal is deemed to be about 1 percent. Such a concentration appears desirable from the standpoint of maximum intensity in the narrowest possible line. However, effective concentrations are deemed to extend as far as 3 percent $Nd^{+3}$. Beyond 3 percent increasing account must be taken of line broadening due to interaction among the neodymium ions themselves. Although stimulated emission may be obtained with concentrations as high as 10 percent, most applications will require a maximum of about 3 percent. Furthermore, crystals having more than about 3 percent neodymium ions are somewhat more difficult to manufacture than are those having smaller concentrations.

From measurements made on the device described above, it is estimated that, at room temperature, the power required to operate a lead molybdate optical maser in accordance with the invention is about 5 percent of that required to operate a ruby maser of similar configuration under the same condition. The optical maser having a calcium molybdate-neodymium active medium had a threshold of about 20 percent of that of ruby, while the strontium molybdate medium required but 0.5 percent of the power required by ruby. Active maser media based on samarium, for example, while operable at liquid hydrogen temperature, are not operable at room temperature.

The material of the invention is conveniently made by a method generally designated as the Czochralski method. Reference may be made to an article by J. Czochralski in Z. Physik, Chemie, vol. 92, pages 219–221 (1918). A recent description of the process is to be found in an article by K. Nassau and L. G. Van Uitert in Journal of Applied Physics, vol. 31, page 1508 (1960). Among the other techniques which may be employed are the flame fusion, hydroethermal flux and spontaneous nucleation techniques.

A particular sample of the lead molybdate material was prepared by placing 122.7 grams of PbO, 79.85 grams $MoO_3$, and .46 gram $Nd_2O_3$ in a platinum crucible and melting it. A homogeneous mixture was produced. A seed crystal of the desired orientation was inserted into the top surface of the melt and was simultaneously rotated and drawn from the melt. Good results were obtained when the speed of rotation was about 30 r.p.m. and the rate of pulling or drawing was about 1/8 inch per hour. The resulting lead molybdate crystal contained about 0.3 percent neodymium ions in place of lead.

A sample of the calcium molybdate material was prepared by placing 60 grams of $CaMoO_4$ in an iridium crucible and melting it. 0.46 gram of $Nd_2O_3$ and 0.65 gram of $MoO_3$ were then added to the melt and a homogeneous mixture was produced. A crystal was then simultaneously rotated and drawn from the melt, with good results being obtained when the speed of rotation was about 30 r.p.m. and the rate of pulling was about ⅓ inch per hour. The crystal contained about 0.2 atomic percent neodymium.

A sample of the strontium molybdate material was prepared by melting, in an iridium crucible, 75 grams of SrMoO$_4$ and adding thereto 0.3 gram of Nd$_2$O$_3$ and 1.4 grams of MoO$_3$. After a homogeneous mixture was produced, a crystal was drawn at about ⅓ inch per hour and with a rotation of about 50 r.p.m. The crystal contained about 0.2 percent neodymium in place of strontium.

It will be noted that, in each case, a considerable excess of neodymium ions was added to the melt. In general, it has been found that the concentration of neodymium in the crystal is about one-fourth of that in the melt. Neodymium may be also added in various other forms such as Nd$_2$(MoO$_4$)$_3$ or alkali rare earth molybdates.

Although the invention has been described with reference to a specific embodiment, this is to be construed by way of illustration and does not limit the scope of the invention. For example, the material of the invention may be used with any concentration of neodymium in the ranges set forth. Furthermore, the material may be used in optical cavity resonators other than the confocal type. The parallel plate resonator, as well as others, may also be employed. Other variations are also possible within the spirit of the invention.

What is claimed is:

1. An optical maser material consisting essentially of a crystalline molybdate host lattice having a composition represented essentially by the chemical formula XMoO$_4$ where X represents a metal chosen from the group consisting of lead, calcium and strontium, in which a portion of the X ions have been replaced by neodymium ions in the trivalent state, the portion of X ions so replaced being in the range of from about 0.01 percent to about 10 percent.

2. An optical maser material as claimed in claim 1 in which the portion of X ions so replaced is in the range of from about 0.01 percent to about 3 percent.

3. An optical maser comprising a negative temperature medium consisting essentially of a material claimed in claim 1, means for producing a population inversion between a pair of optically connected energy levels of said neodymium ions, and means for stimulating coherent emission at the wavelength corresponding to the energy separation of said levels.

4. An optical maser comprising a negative temperature medium consisting essentially of a materialy claimed in claim 2, means for producing a population inversion between a pair of optically connected energy levels of said neodymium ions, and means for stimulating coherent emission at the wavelength corresponding to the energy separation of said levels.

5. An optical maser comprising a negative temperature medium consisting essentially of a lead molybdate host crystal in which about .5 percent of the lead ions have been replaced by neodymium ions in the trivalent state, means for producing a population inversion between a pair of optically connected energy levels of said neodymium ions, and means for stimulating coherent emission at the wavelength corresponding to the energy separation of said levels.

6. An optical maser comprising a negative temperature medium consisting essentially of a calcium molybdate host lattice in which about .5 percent of the calcium ions have been replaced by neodymium ions in the trivalent state, means for producing a population inversion between a pair of optically connected energy levels of said neodymium ions, and means for stimulating coherent emission at the wavelength corresponding to the energy separation of said levels.

7. An optical maser comprising a negative temperature medium consisting essentially of a strontium molybdate host lattice in which about .2 percent of the strontium ions have been replaced by neodymium ions in the trivalent state, means for producing a population inversion between a pair of optically connected energy levels of said neodymium ions, and means for stimulating coherent emission at the wavelength corresponding to the energy separation of said levels.

8. An optical maser as claimed in claim 5 and further comprising means forming an optical cavity resonator, and means for abstracting said coherent emission from said resonator.

9. An optical maser as claimed in claim 6 and further comprising means forming an optical cavity resonator, and means for abstracting said coherent emission from said resonator.

10. An optical maser as claimed in claim 7 and further comprising means forming an optical cavity resonator, and means for abstracting said coherent emission from said resonator.

References Cited by the Examiner

UNITED STATES PATENTS

| 2,929,922 | 3/1960 | Schawlow et al. | 88—10 |
| 3,055,257 | 9/1962 | Boyd et al. | 88—10 |

OTHER REFERENCES

Kroger: "Some Aspects of the Luminescence of Solids," Elsevier Pub. Co., Inc., New York, 1948, pages 52, 110, and 293.

TOBIAS E. LEVOW, *Primary Examiner.*

JULIUS GREENWALD, MAURICE A. BRINDISI,
*Examiners.*

R. D. EDMONDS, *Assistant Examiner.*